(12) United States Patent
Park et al.

(10) Patent No.: US 8,928,176 B2
(45) Date of Patent: Jan. 6, 2015

(54) ENERGY STORAGE SYSTEM

(75) Inventors: Jongho Park, Yongin-si (KR); Namsung Jung, Yongin-si (KR); Jungpil Park, Yongin-si (KR); Sungsoo Hong, Yongin-si (KR); Chungwook Roh, Yongin-si (KR); Sangkyoo Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 753 days.

(21) Appl. No.: 13/183,359

(22) Filed: Jul. 14, 2011

(65) Prior Publication Data

US 2012/0013192 A1  Jan. 19, 2012

(30) Foreign Application Priority Data

Jul. 14, 2010 (KR) ........................ 10-2010-0067871

(51) Int. Cl.
H02J 1/00 (2006.01)
H02J 3/00 (2006.01)
H02J 3/38 (2006.01)
H02J 7/35 (2006.01)
H02M 7/48 (2006.01)

(52) U.S. Cl.
CPC . *H02J 3/383* (2013.01); *H02J 7/35* (2013.01); *H02M 7/4807* (2013.01); *Y02E 10/563* (2013.01); *Y02E 10/566* (2013.01)
USPC .......................................................... 307/80

(58) Field of Classification Search
USPC ............... 307/43, 64–66, 58, 80, 82; 323/207
See application file for complete search history.

(56) References Cited

U.S. PATENT DOCUMENTS

| 6,949,843 | B2 * | 9/2005 | Dubovsky ........................ 307/64 |
| 8,044,538 | B2 * | 10/2011 | Ragonese et al. ................ 307/82 |
| 2005/0099155 | A1 * | 5/2005 | Okuda et al. ................... 320/107 |

FOREIGN PATENT DOCUMENTS

| JP | 06-054553 | 2/1994 |
| JP | 07-146724 | 6/1995 |
| JP | 10-084628 | 3/1998 |
| JP | 2004-180467 | 6/2004 |
| JP | 2009-033802 | 2/2009 |
| KR | 10-2008-0092745 | 10/2008 |

OTHER PUBLICATIONS

English languahe machine translation Kita et al. (JP 2009-033802).*
English languahe machine translation Takehara et al. (JP 10-084628).*

(Continued)

*Primary Examiner* — Rexford Barnie
*Assistant Examiner* — Rasem Mourad
(74) *Attorney, Agent, or Firm* — Christie, Parker & Hale, LLP

(57) ABSTRACT

An energy storage system has a reduced number of capacitors for storing energy such as renewable energy, thereby reducing cost and improving stability of the system. The energy storage system is configured to store power from a power generating unit, and includes: a storage capacitor having a first end electrically coupled to one end of the power generating unit; a secondary battery having a first terminal electrically coupled to a second end of the storage capacitor, and a second terminal electrically coupled to another end of the power generating unit; and a first converter configured to selectively couple the storage capacitor and the secondary battery to a load.

14 Claims, 9 Drawing Sheets

(56) References Cited

OTHER PUBLICATIONS

English languahe machine translation Kodama et al. (JP 07-146724).*
English Machine Translation of Kita (JP2009-033802).*
English Machine Translation of Takehara (JP 10-084628).*
English language machine translation of JP 2004-180467, published Jun. 24, 2004, in the name of Shinohara, 9 shts.
English language machine translation of JP 2009-033802, published Feb. 12, 2009, in the name of Kita et al., 11 shts.
KIPO Office Action dated Aug. 3, 2011 in priority Korean application No. 10-2010-0067871, 4 shts.

* cited by examiner

ENERGY STORAGE SYSTEM

CROSS-REFERENCE TO RELATED APPLICATION

This application claims priority to and the benefit of Korean Patent Application No. 10-2010-0067871, filed Jul. 14, 2010, in the Korean Intellectual Property Office, the entire content of which is incorporated herein by reference.

BACKGROUND

1. Field

Embodiments of the present invention relate to an energy storage system.

2. Description of the Related Art

Recently, renewable energy is emerging due to the depletion of fossil fuels and environmental issues. The renewable energy uses natural energy such as sunlight, solar heat, wind power, tidal power or geothermal heat, and electricity generating systems mainly using sunlight are being widely and practically applied.

A renewable energy generating system is a system that supplies a power of renewable energy generator to a load or a grid. When the power produced by a renewable energy generator is less than the power consumed by a load, all the power available from the renewable energy generator is consumed by the load, and an insufficient power is supplied through a grid. When the power produced by the renewable energy generator is greater than the power consumed by the load, a surplus power that is not consumed by the load among the power produced by the renewable energy generator is supplied to a grid as a reverse flow power.

A power storage system is a system that converts power to a physical or chemical energy and stores the energy. The power storage system is connected to the grid, receives power ("night power") from the grid during night, stores the received power, and uses the energy of the received power during a daytime. Further, an energy storage system supplies an emergency power during blackout, during which electricity is not supplied through the grid.

Such an energy storage system combines a renewable energy generating system and a power storage system, and stores the surplus power from the renewable energy generator and night power from the grid in the power storage system. In the energy storage system, power generated by the renewable energy generating system may be stored in the power storage system, or may be provided to the load and/or the grid.

SUMMARY

Aspects of embodiments according to the present invention are directed toward an energy storage system, which reduces the number of capacitors for storing renewable energy, thereby reducing the cost and securing electrical stability.

According to at least one embodiment, an energy storage system is configured to store power from a power generating unit. The energy storage system includes: a storage capacitor having a first end electrically coupled to one end of the power generating unit; a secondary battery having a first terminal electrically coupled to a second end of the storage capacitor, and a second terminal electrically coupled to another end of the power generating unit; and a first converter configured to selectively couple the storage capacitor and the secondary battery to the load.

The energy storage system may further include an inverter coupled to the first converter.

The energy storage system may further include a controller coupled to the first converter and the inverter, and configured to control an operation of the first converter.

The storage capacitor and the secondary battery may be coupled to an output terminal of the power generating unit.

The first converter may include first and second switches coupled in series across the storage capacitor and the secondary battery, and the inverter may be coupled to a contact point between the storage capacitor and the secondary battery and a contact point between the first and second switches.

The controller may be configured to apply the control signal to the first and second switches to form a path for supplying a power to the load through the storage capacitor or the secondary battery.

The controller may be configured to drive the first and second switches complimentarily.

The energy storage system may further include a maximum power point tracker coupled to the output terminal of the power generating unit, wherein the storage capacitor and the secondary battery are coupled in series across both ends of the maximum power point tracker.

The energy storage system may further include a transformer including a primary winding coupled to the contact point between the storage capacitor and the secondary battery and the contact point between the first and second switches, and a secondary winding coupled to the inverter.

The energy storage system may further include a second converter coupled between the secondary winding of the transformer and the inverter, and for transducing an output power of the transformer into an Alternating Current (AC) power to be applied to the inverter or for transducing an output power of the inverter into a Direct Current (DC) power to be applied to the transformer.

The energy storage system may further include a link capacitor coupled between the second converter and the inverter in parallel, and for storing the power from the second converter or the inverter.

The second converter may include four switches, and the four switches may include transistors or diodes.

The power generating unit may be configured to generate a power with one selected from the group consisting of sunlight, solar heat, wind power, tidal power and geothermal heat.

The converter may be a bi-directional converter.

The inverter may be a bi-directional inverter.

BRIEF DESCRIPTION OF THE DRAWINGS

The accompanying drawings are included to provide a further understanding of the present invention, and are incorporated in and constitute a part of this application. The drawings illustrate exemplary embodiments of the present invention and, together with the description, serve to explain principles of the present invention. In the drawings.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this application will be thorough and complete, and will fully convey the scope of the invention to those skilled in the art.

Hereinafter, the configuration and operation of an energy storage system according to embodiments of the present invention will be described in detail.

Figure 1:
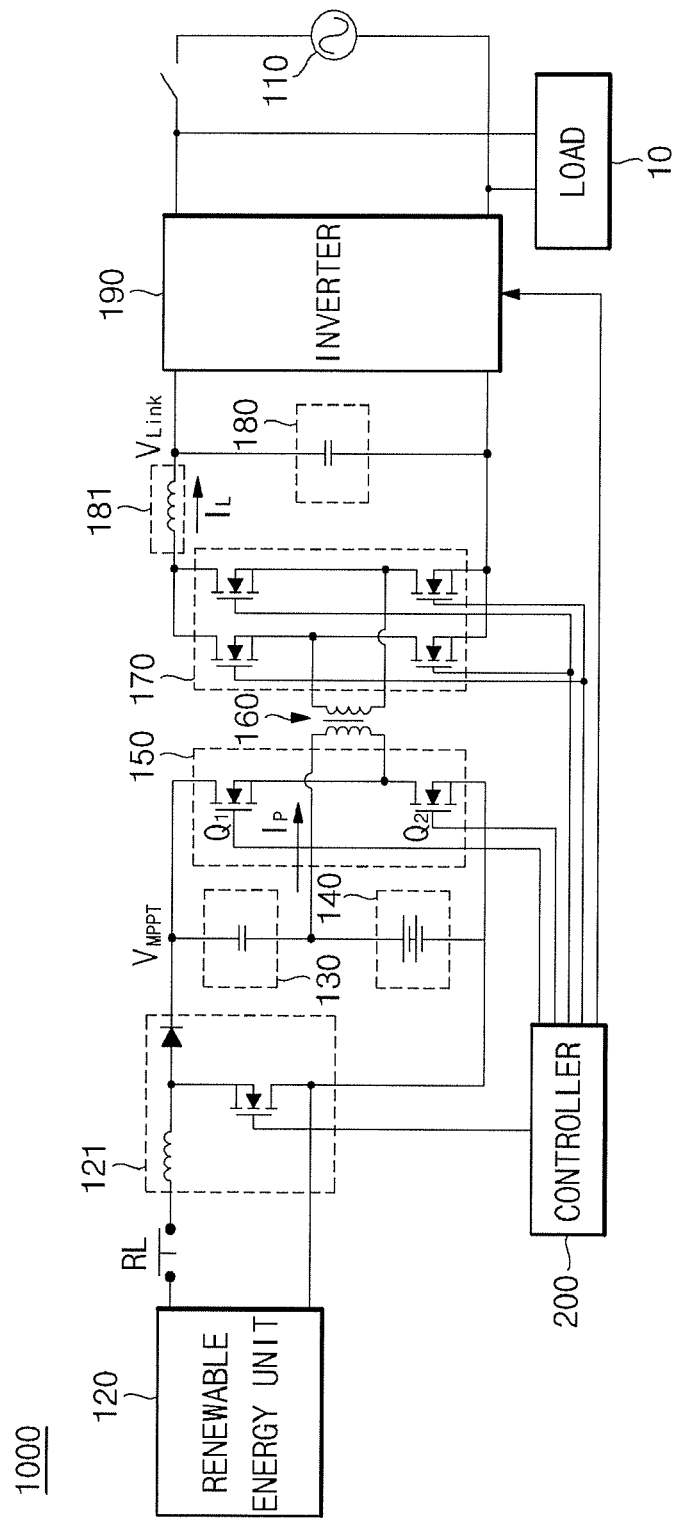
FIG. 1 is a block diagram of an energy storage system according to an embodiment.

FIG. 1 is a block diagram of an energy storage system according to an embodiment.

Referring to FIG. 1, an energy storage system 1000 according to an embodiment includes a renewable energy unit (e.g., a power generating unit) 120, a storage capacitor 130, a battery 140, a first converter 150, a transformer 160, a second converter 170, a link capacitor 180, an inverter 190, and a controller 200.

The renewable energy unit 120 converts natural energy into electrical energy. That is, the renewable energy unit 120 generates a power with renewable energy such as sunlight, solar heat, wind power, tidal power or geothermal heat. In the present application, the renewable energy unit 120 will be described primarily in reference to a solar cell. However, the present invention is not limited thereto.

The renewable energy unit 120 may generate a power during the daytime, for example, when the renewable energy unit 120 includes a solar cell (or solar cells). The renewable energy unit 120 supplies the power, which is generated during the daytime, to the energy storage system 1000. The energy storage system 1000 supplies the received power to the load 10, or stores the received power in the battery 140 of the energy storage system 1000, or provides the received power to a grid 110, which may be connected to the energy storage system 1000.

Moreover, the renewable energy unit 120 may be coupled to a maximum power point tracker 121 through a relay RL. The maximum power point tracker 121 includes an inductor, a switch, and a diode. The maximum power point tracker 121 detects a voltage and a current at a power point where a power generated by the renewable energy unit 120 is at the maximum. Also, the maximum power point tracker 121 maintains the states of the voltage and current and enables the transfer of the maximum power that may be generated by the renewable energy unit 120. In the embodiment depicted in FIG. 1, the maximum power point tracker 121 includes an inductor, a transistor, and a diode, and operates as a booster converter having an output terminal connected to the storage capacitor 130. However, other types of converters may be used in other embodiments. The controller 200 determines the output voltage and current of the maximum power point tracker 121 by adjusting the on/off timing of the transistor of the maximum power point tracker 121.

In the above description, the renewable energy unit 120 is described as being connected to the storage capacitor 130 through the maximum power point tracker 121. However, depending on the type of the energy generator used in the renewable energy unit 120, the maximum power point tracker 121 may not be used, and the renewable energy unit 120 may be directly connected to the storage capacitor 130 through the relay RL.

The storage capacitor 130 and the battery 140 are serially coupled to the output terminal of the maximum power point tracker 121. That is, the output of the maximum power point tracker 121 is distributed to the storage capacitor 130 and the battery 140. If a voltage applied across the both ends of the storage capacitor 130 is higher than the withstand voltage of the storage capacitor 130, the storage capacitor 130 may not operate properly, thus the distribution of the withstand voltage by connecting the capacitors in series may be used. According to an embodiment of the present invention, the storage capacitor 130 and the battery 140 are coupled to the maximum power point tracker 121 in series. The voltage transferred to the storage capacitor 130 is lower than the voltage transferred to the storage capacitor in a case where only the storage capacitor is coupled to the output terminal of the maximum power tracker 121. Therefore, the number of capacitors that constitute the storage capacitor 130 may be reduced. Consequently, the capacitance of the storage capacitor 130 increases, and thus the number of elements which are coupled to the battery 130 in parallel may be reduced. As a result, the number of desired elements in the storage capacitor 130 may be reduced, when the storage capacitor 130 is serially coupled to the battery 140.

The battery 140 may receive a power from at least one of the grid 110 and the renewable energy 120 and may be charged with the power. Moreover, when the load 10 requires an additional power, for example, when a power supply from the grid 110 is cut off or an amount of power consumption of the load 10 is higher than an amount of power that is supplied from the grid 110 and the renewable energy unit 120, the battery 140 may be discharged and thereby supply power to the load 10.

The first converter 150 is coupled to the storage capacitor 130 and the battery 140 as shown in FIG. 1. The first converter 150 controls the turn on/off of the storage capacitor 130 and the battery 140 to allow the storage capacitor 130 and the battery 140 to be charged/discharged. The first converter 150 may be configured with a bi-directional converter, and may allow the power of the storage capacitor 130 and the power of the battery 140 to be supplied to the load 10 or allow the surplus power of the grid 110 to be supplied to the battery 140. The first converter 150 is illustrated as a bi-directional converter in FIG. 1. However, the present invention is not limited to the embodiment using the bi-directional converter, and substantially the same functions may be implemented, for example, by using a plurality of one-directional converters.

In FIG. 1, the first converter 150 includes first and second switches Q1 and Q2 that are coupled in series. Moreover, one end of the primary winding of the transformer 160 is coupled to a contact point between the first and second switches Q1 and Q2, and the other end of the primary winding is coupled to a contact point between the storage capacitor 130 and the battery 140. The first and second switches Q1 and Q2 operate complimentarily. That is, the second switch Q2 is turned off when the first switch Q1 is turned on, but the second switch Q2 is turned on when the first switch Q1 is turned off. The first switch Q1 is turned on to form a path through which the storage capacitor 130 is coupled to the primary winding of the transformer 160. On the other hand, the second switch Q2 is turned on to form a path through which the battery 140 is coupled to the primary winding of the transformer 160. The operations of the first and second switches Q1 and Q2 will be described below in more detail.

The one end of the primary winding of the transformer 160 is coupled to the contact point between the storage capacitor 130 and the battery 140, and the other end of the primary winding of the transformer 160 is coupled to the contact point between the first and second switches Q1 and Q2. Moreover, the secondary winding of the transformer 160 is coupled to the second converter 170. Thus, the storage capacitor 130 and the battery 140 are disconnected from the inverter 190 by the transformer 160, thereby securing electrical stability.

Moreover, the transformer 160 receives a voltage from the storage capacitor 130 or the battery 140 and boosts or steps down the voltage according to a winding ratio, or it receives a voltage from the grid 110 and boosts or steps down the voltage according to a winding ratio.

The second converter 170 is coupled to the secondary winding of the transformer 160. The second converter 170 may be configured in a bridge transistor type including four switches. Also, the control electrode of each of the switches is coupled to the controller 200, and each of the switches may be turned on/off according to the signal of the controller 200. The second converter 170 transduces an AC voltage, which is outputted from the secondary winding of the transformer 160, into a DC voltage. The DC voltage outputted from the second converter 170 may be applied to the inverter 190 through the link capacitor 180. Moreover, the second converter 170 transduces a DC voltage applied from the inverter 190 into an AC voltage and applies the AC voltage to the secondary winding of the transformer 160.

Moreover, although the second converter 170 is shown and described in reference to a full bridge structure having four transistors, the second converter 170 may be configured with a full-bridge diode that is configured with four diodes and is commonly used. In this case, the second converter 170 operates as a rectifier, i.e., receives the AC voltage from the transformer 160 and rectifies the AC voltage into a DC voltage.

The link capacitor 180 is coupled between the second converter 170 and the inductor 190. The link capacitor 180 is charged to link voltage due to the output voltage of the second converter 170 or the inverter 190. Therefore, even if the output voltage of the second converter 170/the inductor 190 fluctuates, the voltage of the inductor 190/the second converter 170 can be maintained constantly (or substantially constantly).

One end of the inverter 190 is coupled to the link capacitor 180. The inverter 190 may be configured with a bi-directional inverter. The inverter 190 receives the output voltage of the link capacitor 180 and converts the output voltage into an AC voltage suitable for the load 10. Also, the inverter 190 receives the AC voltage of the grid 110, converts the AC voltage into a DC voltage through a rectifying operation, and applies the DC voltage to the second converter 170. Therefore, the AC voltage transduced by the second converter 170 may be transferred to and stored in the battery 140 through the transformer 160.

Moreover, the other end of the inverter 190 is coupled to the grid 110. The inverter 190 may be configured with four switches and performs voltage conversion according to the turn-on/off of each of the switches. Such a configuration is known to those skilled in the art, and thus its detailed description will be omitted.

The controller 200 is coupled to the maximum power point tracker 121, the first converter 150, the second converter 170 and the inverter 190. The controller 200 is coupled to the control electrodes of switches that configure the maximum power point tracker 121, the first converter 150, the second converter 170 and the inverter 190. Thus, the controller 200 controls the turn-on/off of the switches with control signals.

Particularly, the controller 200 may control the turn-on/off of the first and second switches Q1 and Q2 of the first converter 150 and allow a power to be applied through the first converter 150. The controller 200 may turn on the first switch Q1 and allow the power of the storage capacitor 130 to be applied to the load 10. Also, the controller 200 may turn on the second switch Q2 and allow the power of the battery 140 to be applied to the load 10, or may allow the battery 140 to receive a power from the maximum power point tracker 121 or the grid 110 and to be charged with the received power.

The following description will be made on an operation where the controller of the energy storage system according to an embodiment controls the first converter 150.

Figure 2:
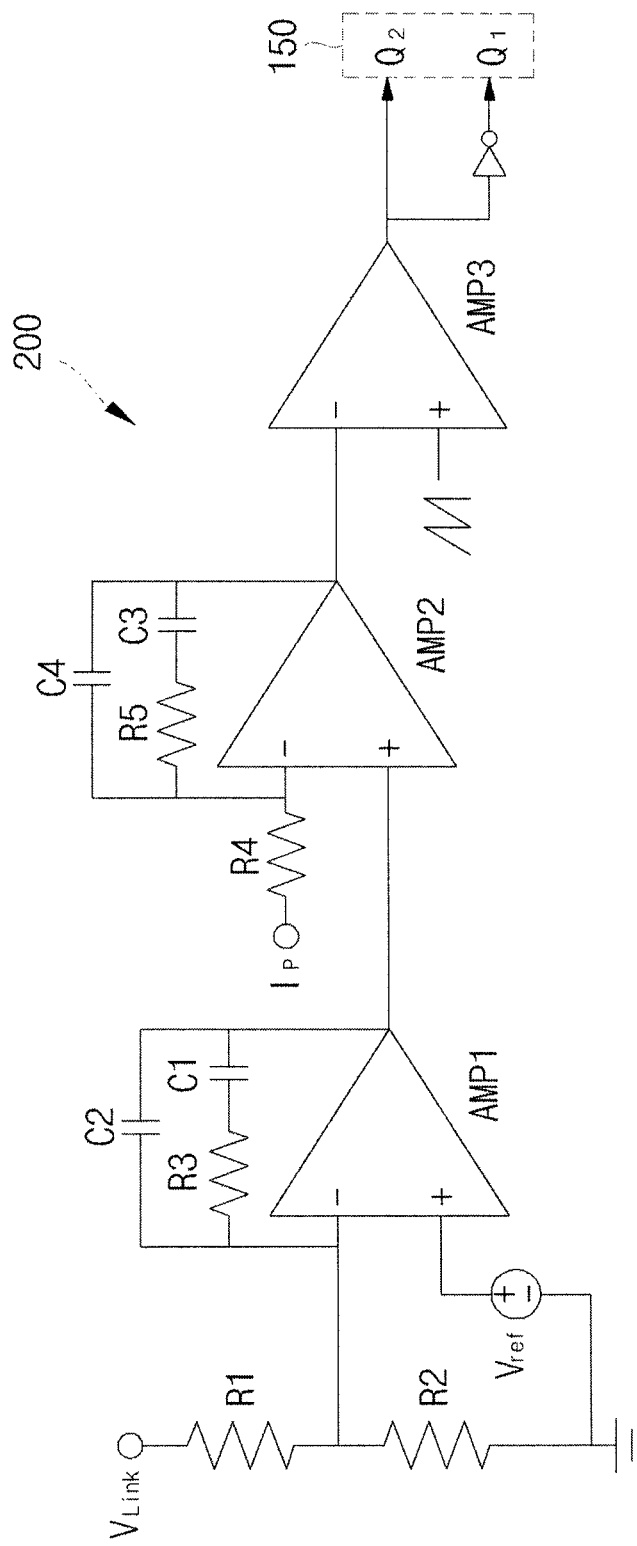
FIG. 2 is a circuit diagram of a controller of an energy storage system according to an embodiment which controls a duty ratio.

FIG. 2 is a circuit diagram of a controller of an energy storage system according to an embodiment which controls a duty ratio.

Referring to FIG. 2, the controller 200 includes three operational amplifiers AMP1, AMP2 and AMP3 that are coupled to the first converter 150, a feedback circuit of the operational amplifier AMP1, and a feedback circuit of the operational amplifier AMP2.

First, a voltage $V_{Link}$ that is applied across the ends of the link capacitor 180 is divided by first and second resistors R1 and R2 that are serially connected. A voltage that is applied across the second resistor R2 is applied to the negative terminal (−) of the first operational amplifier AMP1 as an input voltage, and a reference voltage Vref is applied to the positive terminal (+) of the first operational amplifier AMP1. A third resistor R3, a first capacitor C1 and a second capacitor C2 that form the feedback of the first operational amplifier AMP1 amplifies a difference between voltages that are applied to the input terminals (+, −) of the first operational amplifier AMP1. Thus, the first operational amplifier AMP1 operates and outputs a voltage corresponding to the voltage difference of the voltage $V_{Link}$ of the link capacitor 180 with respect to the reference voltage Vref. Accordingly, the higher the voltage $V_{Link}$ of the link capacitor 180, the lower the output value. To the contrary, the lower the voltage $V_{Link}$ of the link capacitor 180, the higher the output value.

The second operational amplifier AMP2 that is a next stage receives the output voltage of the first operational amplifier AMP1 through a positive terminal (+). Also, the second operational amplifier AMP2 receives a current Ip, which flows through the primary winding of the transformer 160, through a negative terminal (−) and a fourth resistor R4 that are coupled in series. If the second operational amplifier AMP2 is an ideal amplifier, the voltage of the negative terminal (−) is the same as that of the positive terminal (+) in operating. Accordingly, the primary winding current Ip may be changed into a voltage signal proportional to it. A fifth resistor R5, a third capacitor C3 and a fourth capacitor C4 that form the feedback of the second operational amplifier AMP2 compares the voltage signal with the output voltage of the first operational amplifier AMP1 to operate and output a voltage difference. Accordingly, the higher the primary winding current Ip, a lower value is outputted. To the contrary, the lower the primary winding current Ip, a higher value is outputted.

The third operational amplifier AMP3 that is a stage next to the second operational amplifier AMP2 receives the output voltage of the second operational amplifier AMP2 through a negative terminal (−). Also, the third operational amplifier AMP3 receives a sawtooth wave having a certain frequency (for example, 50 KHz) through a positive terminal (+). The third operational amplifier AMP3 compares the sawtooth wave with the output voltage of the second operational amplifier AMP2 to operate according to the voltage difference. Here, the third operational amplifier AMP3 does not have a feedback connection, and thus it operates in a saturation region. Therefore, when the output voltage of the second operational amplifier AMP2 is greater than the sawtooth wave, a positive saturation voltage value is outputted, but when the output voltage of the second operational amplifier AMP2 is less than the sawtooth wave, a negative saturation voltage value is outputted.

The controller 200 uses the output voltage of the third operational amplifier AMP3 as the control voltage of the second switch Q2. The controller 200 inverts the output voltage of the third operational amplifier AMP3 and uses the inverted voltage as the control voltage of the first switch Q1. As a result, the controller 200 determines a duty ratio between the first and second switches Q1 and Q2.

Accordingly, the controller 200 may determine the duty ratio between the first and second switches Q1 and Q2 that configure the first converter 150 (e.g., bi-directional converter 150) by using the voltage $V_{Link}$ of the link capacitor 180 and the primary winding current Ip.

During daytime when the grid 110 is coupled to the energy storage system, all the energy of the renewable energy unit 120 is transferred to the load 10 through the link capacitor 180. Accordingly, the secondary winding current $I_L$ of the transformer 160 has an average value of 0 A. In this case, the controller 200 determines the output voltage of the second operational amplifier AMP2 that allows the secondary winding current $I_L$ to become 0 A, and the third operational amplifier AMP3 compares the determined voltage with the sawtooth wave to determine the duty ratio between the first and second switches Q1 and Q2.

When the grid 110 is disconnected, the voltage of the link capacitor 180 should be maintained at a predetermined voltage (for example, 400 V). Thus, the controller 200 compares the voltage $V_{Link}$ of the link capacitor 180 with the reference voltage Vref to output a voltage, and determines the output voltage of the second operational amplifier AMP2 that allows the secondary winding current $I_L$ to flow in order for the same voltage as the output voltage to be generated. Moreover, the controller 200 compares the output voltage of the second operational amplifier AMP2 with the sawtooth wave to determine the duty ratio between the first and second switches Q1 and Q2 through the third operational amplifier AMP3.

The following description will be made on power flow based on the operation of the first converter 150 of the energy storage system according to an embodiment.

Figure 3:
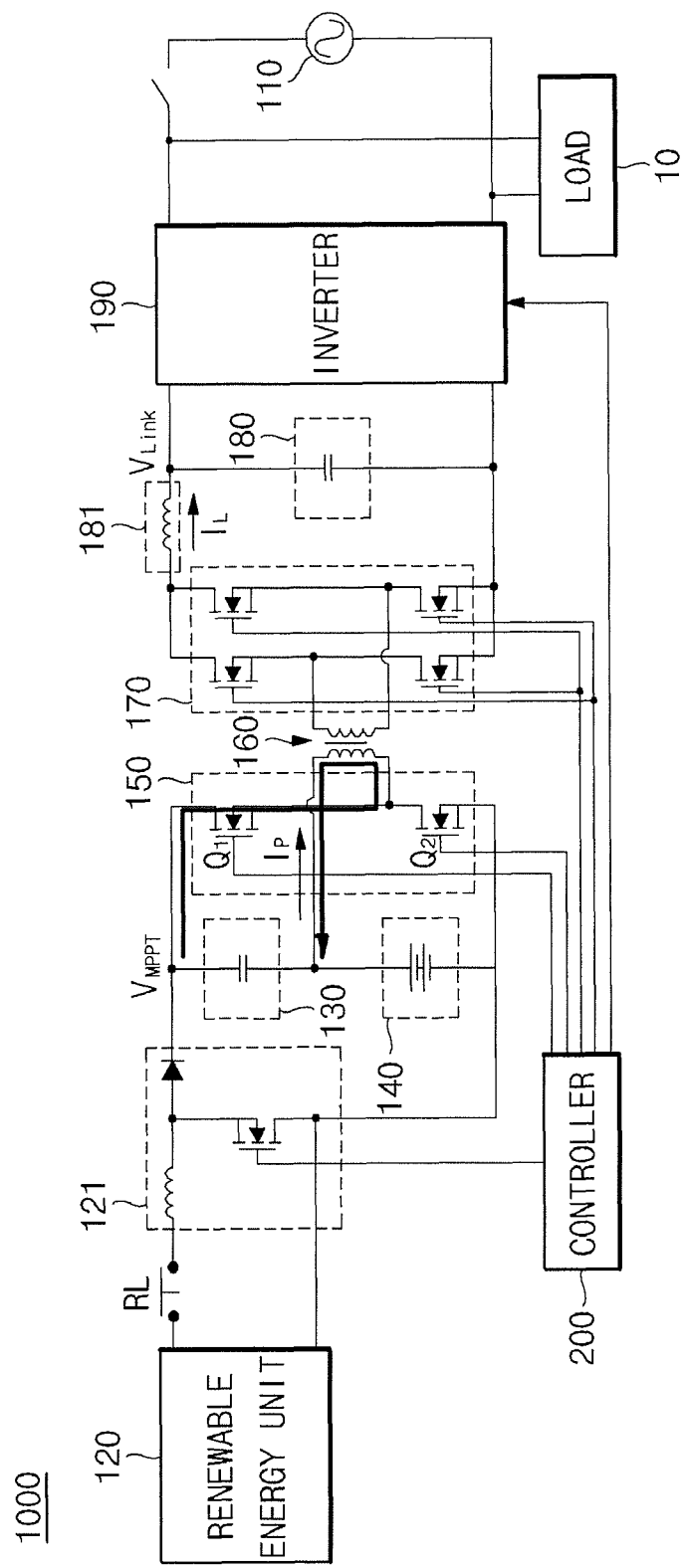
FIG. 3 is a diagram for describing a circuit configuration when operating a first switch of a first converter in an energy storage system according to an embodiment.
Figure 4:
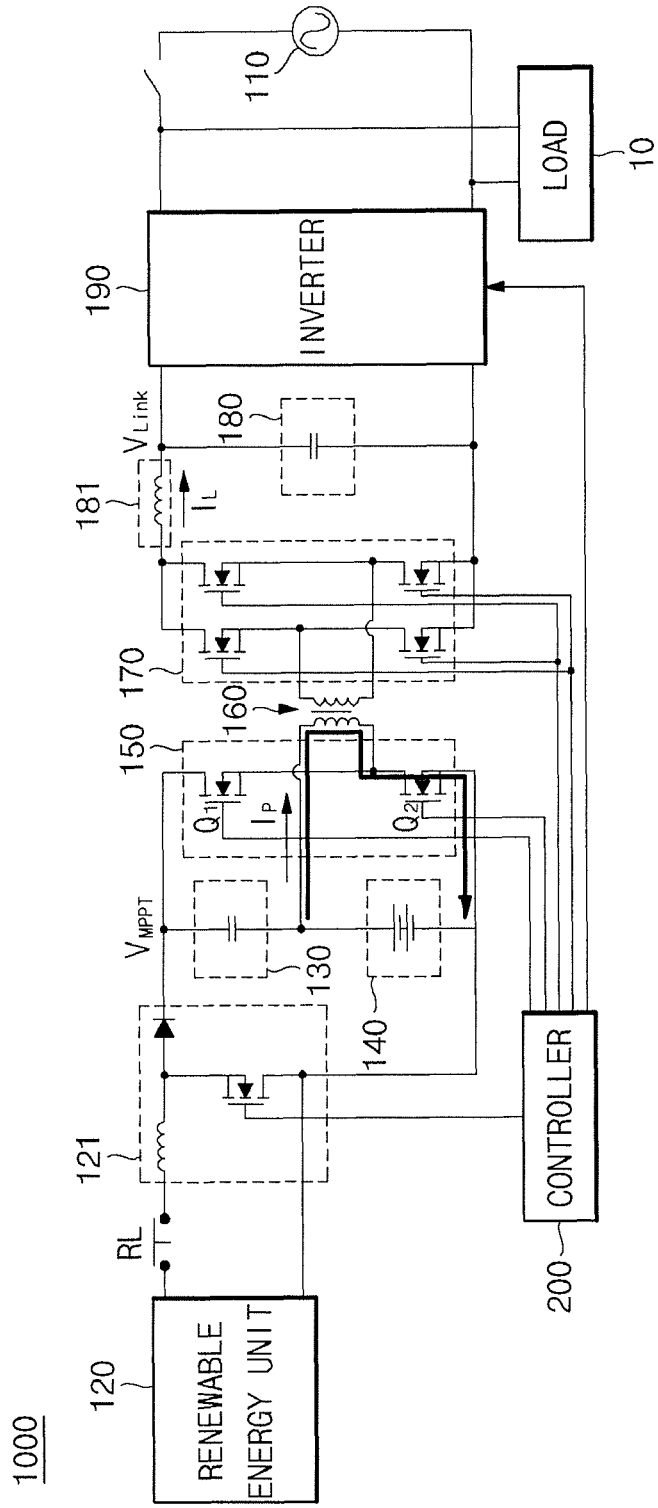
FIG. 4 is a diagram for describing a circuit configuration when operating a second switch of a first converter in an energy storage system according to an embodiment.

FIG. 3 is a diagram for describing a circuit configuration when operating the first switch Q1 of the first converter 150 in the energy storage system according to an embodiment. FIG. 4 is a diagram for describing a circuit configuration when operating the second switch Q2 of the first converter 150 in the energy storage system according to an embodiment.

Referring to FIG. 3, when the first switch Q1 of the first converter 150 is turned on, a current path that passes through the primary winding of the transformer 160 from the storage capacitor 130 is formed along a path that is indicated by an arrow. Accordingly, the discharge path of the renewable energy unit 120 is formed.

Referring to FIG. 4, when the second switch Q2 of the first converter 150 is turned on, a current path that passes through the primary winding of the transformer 160 from the battery 140 is formed along a path that is indicated by an arrow. Accordingly, the discharge path of the battery 140 is formed. Also, the path may operate as the charge path of the battery 140 according to the direction of a current.

Moreover, when the first and second switches Q1 and Q2 are turned on, the direction of a current that passes through the first switch Q1 and the primary winding is opposite to the direction of a current that passes through the second switch Q2 and the primary winding, and thus a current and a voltage that are applied to the primary winding of the transformer 160 have an AC type. Therefore, the transformer 160 may boost a voltage that is applied from the primary winding.

Hereinafter, a description on the power flow of the energy storage system according to an embodiment will be divided depending on cases.

Figure 5:
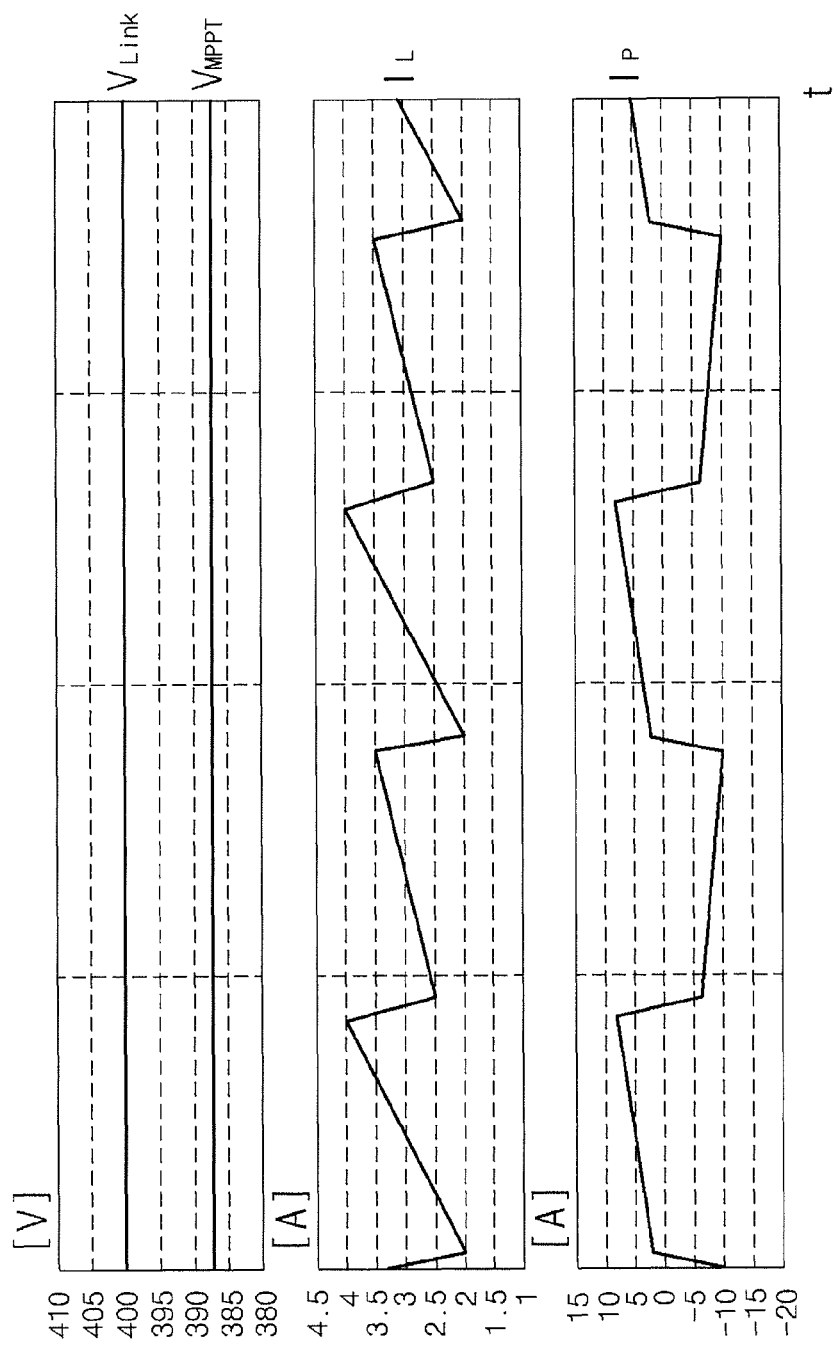
FIG. 5 is a diagram showing characteristics of a voltage and current when a power failure occurs in a grid coupled to an energy storage system according to an embodiment and a power of a solar cell remains.

FIG. 5 shows characteristics of a voltage and current when a power failure occurs in a grid of an energy storage system according to an embodiment and a power output of a solar cell exceeds demand.

FIG. 5 illustrates a graph when the voltage $V_{Link}$ of the link capacitor 180 is 400 V, the voltage of the battery 140 is 200 V, the generation power of the renewable energy unit 120 is 1.6 KW and the consumption power of the load 10 is 1.2 KW. At this point, the average of the current $I_L$ of the inductor 181 is about 3 A, and when multiplying the 3 A and the voltage $V_{Link}$ of 400 V of the link capacitor 180, it can be seen that the consumption power of the load 10 is 1.2 KW. In this case, an average current is shown as about −2 A in the primary winding of the transformer 160. Moreover, the primary winding current Ip may be recognized as the discharge current of the battery 140, and thus it can be seen that the battery 140 is being charged.

Accordingly, when a power failure occurs in the grid 110, it can be seen through the simulation of FIG. 5 that a residual power of 400 W which is not transferred to the load 10 by the renewable energy unit 120 is supplied to the battery 140 and the battery 140 is being charged with the supplied power.

Figure 6:
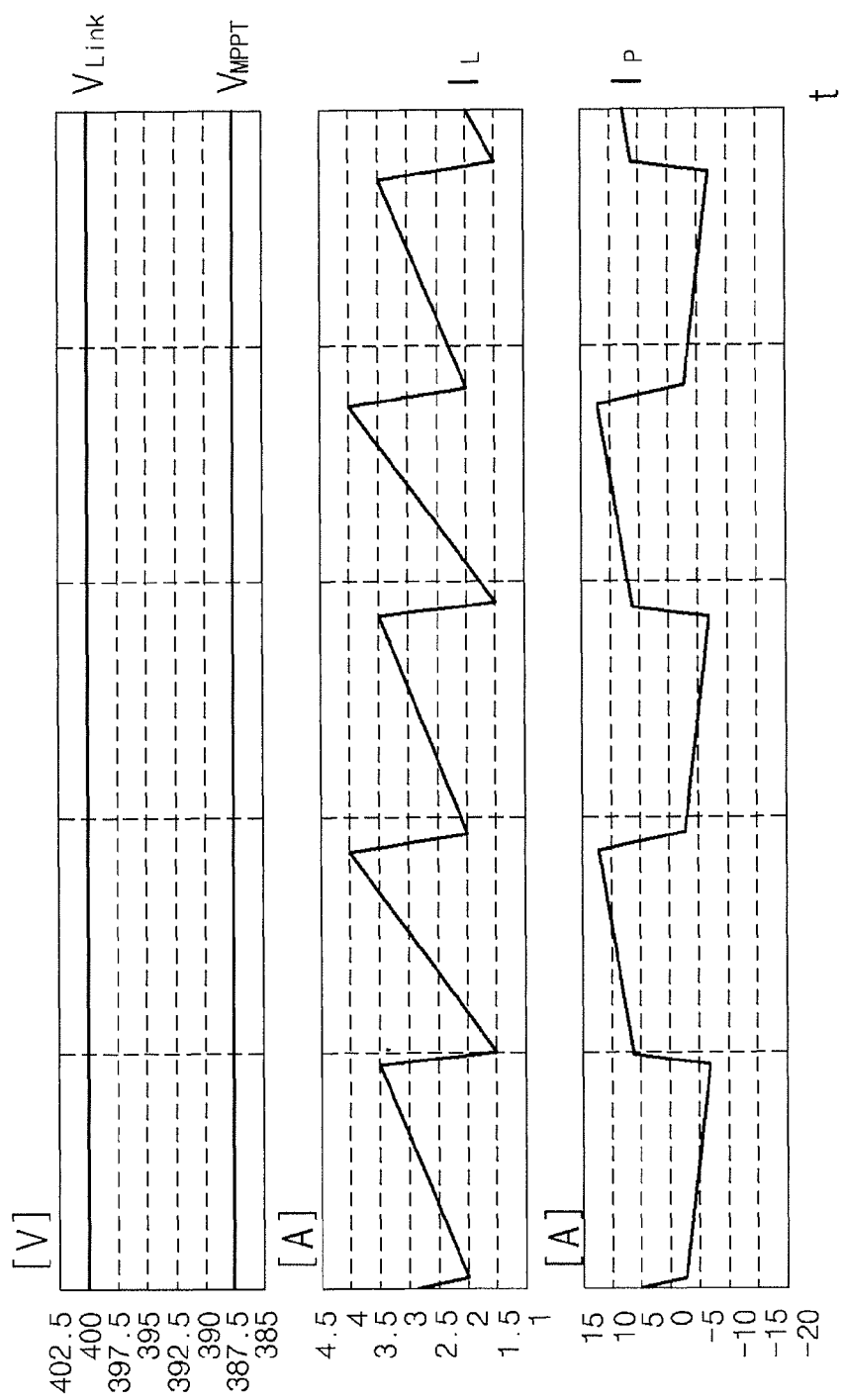
FIG. 6 is a diagram showing characteristics of a voltage and current when a power failure occurs in a grid coupled to an energy storage system according to an embodiment and a power of a solar cell is insufficient.

FIG. 6 shows characteristics of a voltage and current when a power failure occurs in a grid of an energy storage system according to an embodiment and a power output of a solar cell is insufficient to meet demand.

In the simulation of FIG. 6, the voltage of the battery 140 is 200 V and the consumption power of the load 10 is 1.2 KW, but the generation power of the renewable energy unit 120 is set to 800 W. In this case, an average current is shown as about 2 A in the primary winding of the transformer 160.

Accordingly, when the grid 110 is cut off, a power is transferred from the renewable energy unit 120 to the load 10. In this case, the power from the renewable energy unit 120 is insufficient to meet the demand of the load 10. A power of 400 W is supplied from the battery 140 to the load 10 to supplement the power supplied by the renewable energy unit 120, therefore it can be seen through the simulation of FIG. 6 that the battery 140 is being discharged.

Figure 7:
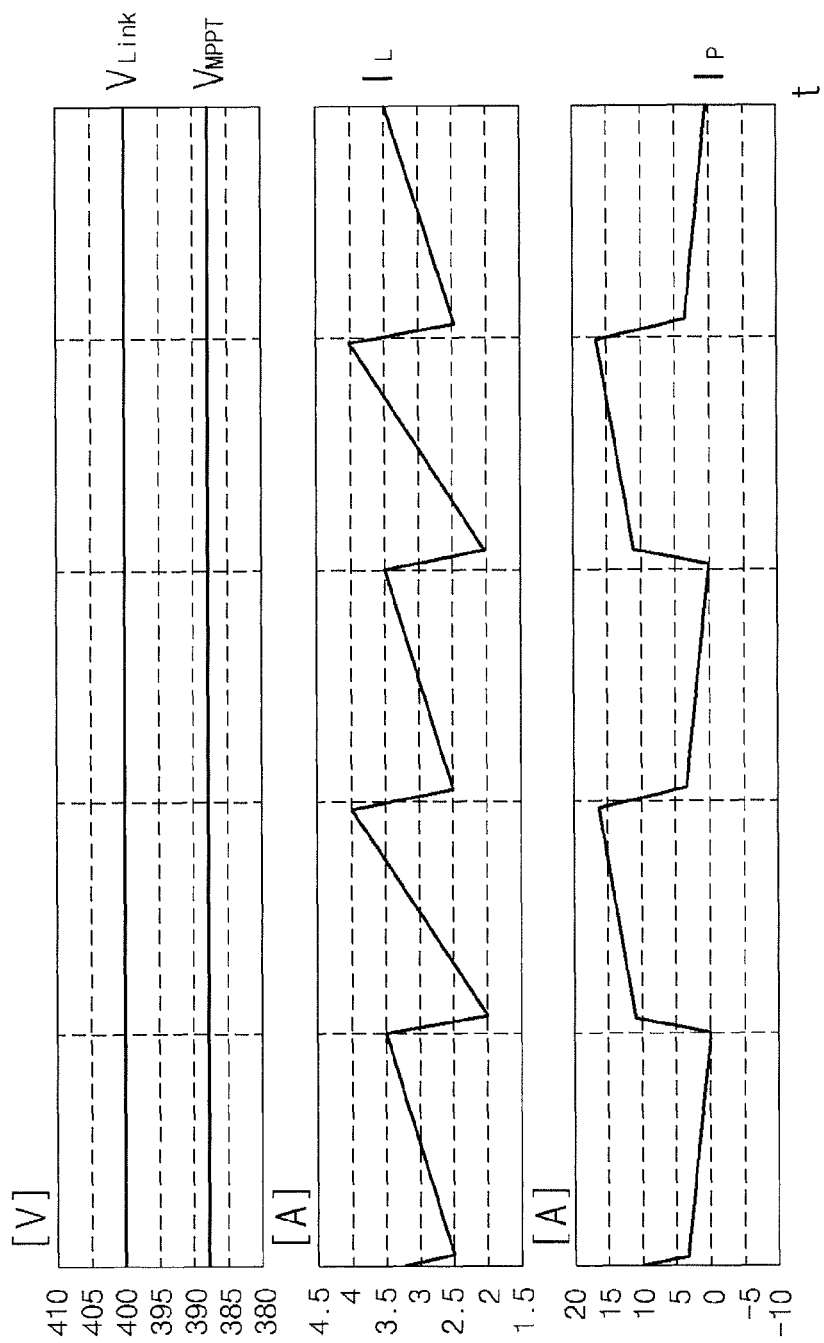
FIG. 7 is a diagram showing characteristics of a voltage and current when a power failure occurs in a grid coupled an energy storage system according to an embodiment and a power of a solar cell is not generated.

FIG. 7 shows characteristics of a voltage and current when a power failure occurs in a grid of an energy storage system according to an embodiment and a power of a solar cell is not generated.

In the simulation of FIG. 7, the voltage of the battery 140 is 200 V and the consumption power of the load 10 is 1.2 KW, but the generation power of the renewable energy unit 120 is set to 0 W (for example, at night). In this case, an average current is shown as about 6 A in the primary winding of the transformer 160.

Accordingly, when the grid 110 is cut off and power is not generated by the renewable energy unit 120, it can be seen through the simulation of FIG. 7 that the battery 140 supplies 1.2 KW required by the load 10 to the load 10.

Figure 8:
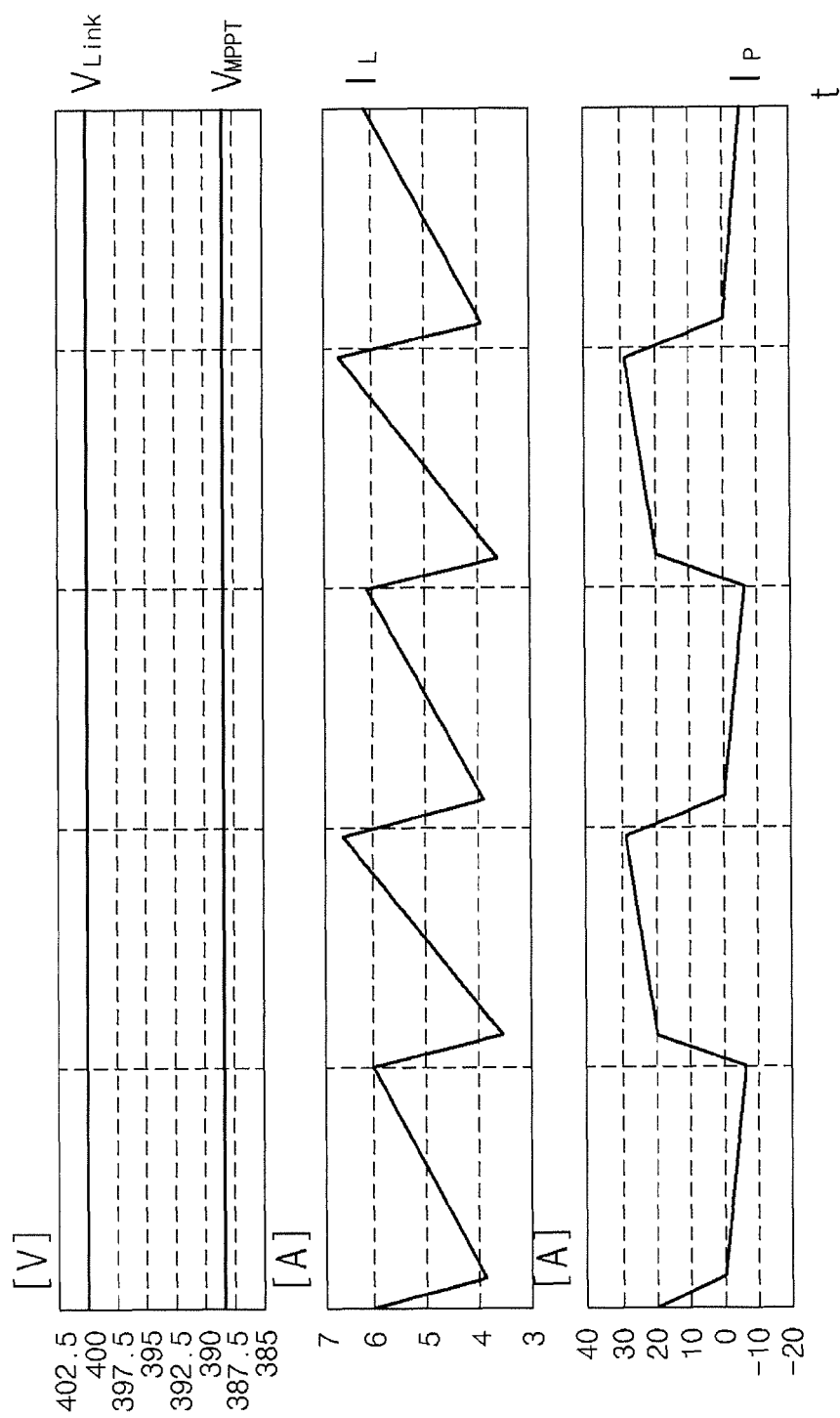
FIG. 8 is a diagram showing characteristics of a voltage and current when a power is supplied from a battery in the connecting of a grid coupled to an energy storage system according to an embodiment.

FIG. 8 shows characteristics of a voltage and current when a power is supplied from a battery of an energy storage system that is coupled to a grid according to an embodiment.

In the simulation of FIG. 8, the voltage of the battery 140 is 200 V, a consumption power transferred from the inverter 190 to the load 10 is 2 KW because the load 10 is in a peak state, the power generated by the renewable energy unit 120 is set to 0 W (for example, at 5 p.m. to 10 p.m.), and the grid 110 is set in a connected state. In this case, an average current is shown as about 10 A in the primary winding of the transformer 160.

When the grid 110 is connected and an amount of power is not generated by the renewable energy unit 120, it can be seen through the simulation of FIG. 8 that the battery 140 supplies a power of 1.2 KW other than a power supplied from the grid 110 to the load 10 to meet the power demand of the load 10.

Figure 9:
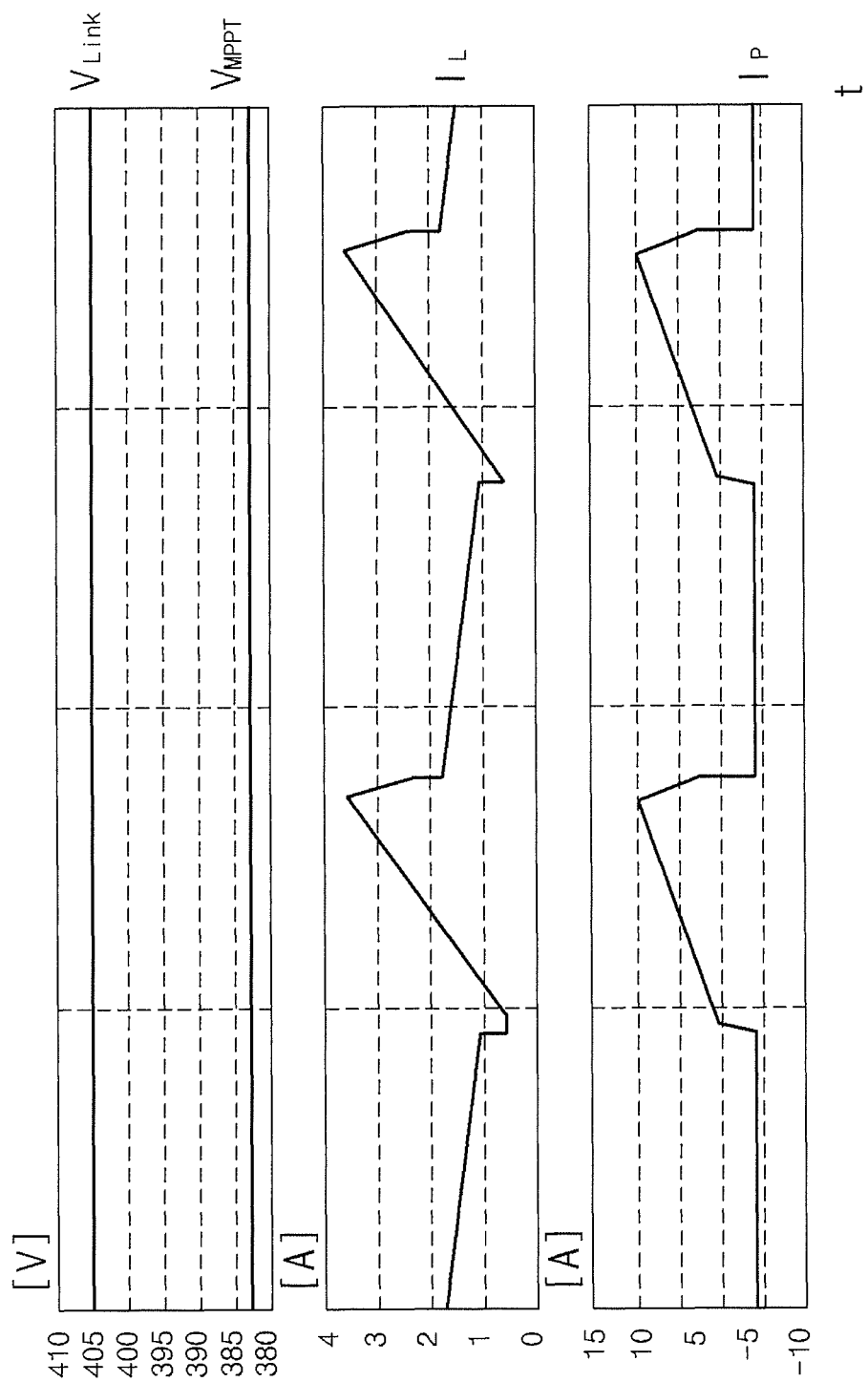
FIG. 9 is a diagram showing characteristics of a voltage and current when a power of a solar cell is supplied to a load in the connecting of a grid coupled to an energy storage system according to an embodiment.

FIG. 9 shows characteristics of a voltage and current when a power of a solar cell is supplied to a load of an energy storage system that is coupled to a grid according to an embodiment.

In the simulation of FIG. 9, the consumption power of the load 10 is 1.2 KW, the power generated by the renewable energy unit 120 is set to 700 W, and the grid 110 is connected. In this case, an average current is shown as about 0 A in the primary winding of the transformer 160. Also, since the average current of an inductor current $I_L$ is about 1.75 A and the voltage $V_{Link}$ of the link capacitor 180 is about 400 V, it can been seen through the simulation of FIG. 9 that all the power of 700 W generated by the renewable energy unit 120 is transferred to the load 10 and the battery 140 is not charged/discharged.

The energy storage system according to embodiments of the present invention serially connects the storage capacitor and the battery to the output terminal of the maximum power point tracker and allows the storage capacitor to divide and receive a voltage, and thus the number of elements configuring the storage capacitor can be reduced.

Moreover, the energy storage system according to embodiments couples one end of the primary winding to the contact point between the storage capacitor and the battery, couples the other end of the primary winding to the contact point between the first and second switches, includes the transformer having the secondary winding coupled to the rectifier, and disconnects the storage capacitor and the battery from the inverter, thereby securing electrical stability.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims and their equivalents.

What is claimed is:

1. An energy storage system configured to store power from a power generating unit, the energy storage system comprising:
a storage capacitor having a first end electrically coupled to one end of the power generating unit;
a secondary battery having a first terminal electrically coupled to a second end of the storage capacitor, and a second terminal electrically coupled to another end of the power generating unit;
a first converter configured to selectively couple the storage capacitor and the secondary battery to a load, the first converter comprising first and second switches coupled in series across the storage capacitor and the secondary battery; and
a transformer coupled to a contact point between the storage capacitor and the secondary battery and a contact point between the first and second switches.

2. The energy storage system as claimed in claim 1, further comprising an inverter coupled to the first converter.

3. The energy storage system as claimed in claim 2, further comprising a controller coupled to the first converter and the inverter, and configured to control an operation of the first converter.

4. The energy storage system as claimed in claim 2, wherein the inverter comprises a bi-directional inverter.

5. The energy storage system as claimed in claim 1, wherein the storage capacitor and the secondary battery are coupled to an output terminal of the power generating unit.

6. The energy storage system as claimed in claim 1, further comprising a controller, wherein the controller is configured to apply a control signal to the first and second switches to form a path for supplying a power to the load through the storage capacitor or the secondary battery.

7. The energy storage system as claimed in claim 6, wherein the controller is configured to drive the first and second switches complimentarily.

8. The energy storage system as claimed in claim 2, wherein the transformer comprises:
a primary winding coupled to the contact point between the storage capacitor and the secondary battery and the contact point between the first and second switches; and
a secondary winding coupled to the inverter.

9. The energy storage system as claimed in claim 8, further comprising a second converter coupled between the secondary winding of the transformer and the inverter, and for transducing an output power of the transformer into an Alternating Current (AC) power to be applied to the inverter or for transducing an output power of the inverter into a Direct Current (DC) power to be applied to the transformer.

10. The energy storage system as claimed in claim 9, further comprising a link capacitor coupled between the second converter and the inverter in parallel, and for storing the power from the second converter or the inverter.

11. The energy storage system as claimed in claim 9, wherein the second converter comprises four switches, and the four switches are transistors or diodes.

12. The energy storage system as claimed in claim 1, wherein the first converter comprises a bi-directional converter.

13. The energy storage system as claimed in claim 1, further comprising a maximum power point tracker coupled to an output terminal of the power generating unit, wherein the storage capacitor and the secondary battery are coupled in series across both ends of the maximum power point tracker.

14. The energy storage system as claimed in claim 7, wherein the controller comprises an amplifier comprising an output,
wherein the output is directly connected to the second switch, and wherein the output is connected to the first switch through an inverter.

\* \* \* \* \*